United States Patent [19]

Charlebois et al.

[11] Patent Number: 4,528,419
[45] Date of Patent: Jul. 9, 1985

[54] FORMING OF CABLE SPLICE CLOSURES

[75] Inventors: Leonard J. Charlebois, Kanata; Ronald R. D'Aoust, Nepean; Fred A. Huszarik, Kanata, all of Canada

[73] Assignee: Northern Telecom Limited, Montreal, Canada

[21] Appl. No.: 560,542

[22] Filed: Dec. 12, 1983

[51] Int. Cl.³ ................... H02G 15/08; H01R 5/02
[52] U.S. Cl. .................... 174/88 R; 29/868; 29/873; 156/49; 156/55; 156/56; 156/245; 264/272.14; 264/272.15
[58] Field of Search ............ 29/868, 872, 873; 156/49, 55, 56, 245; 264/272.11, 272.14, 272.15; 174/88 R, 88 S

[56] References Cited

U.S. PATENT DOCUMENTS 4,322,573 3/1982 Charlebois .............. 156/49 X
4,392,014 7/1983 Trumble et al. ......... 156/49 X Primary Examiner—Robert A. Dawson
Attorney, Agent, or Firm—R. J. Austin

[57] ABSTRACT

A method of forming an encapsulated splice region between two cable ends in which, after end portions of the core have been exposed beyond the jacket and sheath or shield, the conductors are splayed outwards and the cable end portions are brought close together. Splices are then formed between conductors of the two cables and the conductors are folded over either one cable jacket or the other to locate each splice upon and supported by the jacket. Each splice is individually covered with sealing material and end regions of the cables are encapsulated so as to encapsulate the splices and fluid tightly seal them.

10 Claims, 7 Drawing Figures

FORMING OF CABLE SPLICE CLOSURES

This invention relates to the forming of cable splice closures.

A telecommunications cable from a central office and for underground or aerial use, comprises a core having a plurality, possibly up to 3,600 pairs of individually insulated conductors.

When laying cable, it is sometimes necessary to join cables together, end-to-end, to achieve a required length of layed cable. Conventionally, in such situations, conductors are spliced together from cable-to-cable, by removing the end portions of core surrounding material, i.e. cable sheaths and jackets, so that the cores project beyond them, bringing the cable cores close together, and then joining the conductor ends while retaining them between the cable sheaths and jackets. Connections are then sealed and a closure placed over the region of the splice, i.e. to bridge the gap between and extend over the sheaths.

A problem which exists with this conventional method is that inexplicably some moisture paths remain and splices are known to fail because of contact by moisture. It is believed that one possible reason for this is that moisture passes along the inside of cables even though steps are taken to prevent ingress of moisture. Upon the moisture reaching a splice, any connection between conductors which is not perfectly sealed then allows passage of moisture and hence splice failure.

The present invention provides a method of forming a splice closure and a splice closure in which the above problem is at least partly alleviated by minimizing the number of splice failures caused by moisture ingress when telecommunications cables are joined end-to-end. The method of the invention concerns removing material of the two cable ends which surround the cores, spreading the conductors radially out beyond the cable diameters and bringing the two cable ends together with the ends of material remaining around the cores being sufficiently close together to enable sufficient lengths of conductor for spliced conductors to be located axially along one cable with the splice over the core surrounding material. The spliced conductors are then individually sealed and the whole cable splice is closed by an encapsulation which extends across and surrounds the core surrounding material on each cable and each conductor splice.

Accordingly, the present invention provides a method of forming an encapsulated splice region between two cable ends comprising:
  removing core surrounding material from end portions of two cables to provide end portions of core surrounding material and cable core regions projecting a certain distance beyond said end portions of surrounding material;
  turning the conductors of said regions so that they extend radially outwards from the cables;
  bringing the cable end portions and portions of core surrounding material closer together and axially disposed relative to each other;
  electrically connecting conductors of one cable end with those of the other to form conductor splices; and
  with each conductor splice located upon an end portion of core surrounding material with its conductors extending across said end portion and to their respective cable cores, individually enclosing each conductor splice within sealing material and encapsulating axially over the end portions of core surrounding material to cover and fluid tightly seal the conductor splices.

With the process according to the invention, the conductor splices lying within their sealing material are supported by the end portion of the core surrounding material during encapsulation to allow a compressive sealing action to take place and provide an effective seal. After encapsulation, the splices are sealingly separated from each other and sealed by the sealing material from said core region.

To enclose the splices, sealing material preferably in the form of heat softenable sealing tape is provided as overlapped and contacting windings. To enclose the splices most conveniently, first windings are provided around the end portion of core surrounding material, the splices are disposed in spaced positions upon these first windings, second windings are wrapped in overlapped and contacting relationship over the splices and first windings and the encapsulation is positioned to surround the windings with the temperature of encapsulation sufficiently high to soften the sealing tape and merge it into a single mass to sealingly enclose each individual splice. Thus the first and second windings become united as an integral unit.

Preferably, the encapsulation is formed by moulding a mouldable plastics material around the end portions of core surrounding material. Upon cooling of the encapsulation, it shrinks upon the softened sealing tape and resultant pressure causes the merged single mass of tape to become shaped intimately into fluid tight sealing contact with each splice. Hence, because of the effectiveness of the seal formed around each individual splice, any moisture present in the core region between the cables or lying around the encapsulation and cables is effectively prevented from reaching the splice. It follows that the main purpose of the encapsulation is to form a seal of the sealing material around each splice, while it is a less important consideration that the encapsulation seals with the surface of core surrounding material of each end region. However, it is preferred that such a seal is provided and for this purpose, the encapsulation material is preferably compatible with the surface of the core surrounding material to form a bond provided by the heat of moulding.

As an alternative, the encapsulation is formed from a heat shrinkable material which provides the heat for softening the sealing tape.

The invention also includes an assembly of two telecommunications cables disposed end-to-end with conductors of each cable core electrically connected each to one conductor of the other cable to form a conductor splice, the conductors for each splice extending outwardly from the cores, and axially alongside core surrounding material of one of the cables to dispose the splice radially outwards of the core surrounding material, each splice individually sealed by sealing material, and an encapsulation extending across the two cable ends so as to surround the sealed splices and end portions of the core surrounding material.

One embodiment of the invention will now be described by way of example, with reference to the accompanying drawings in which.

Figure 1:
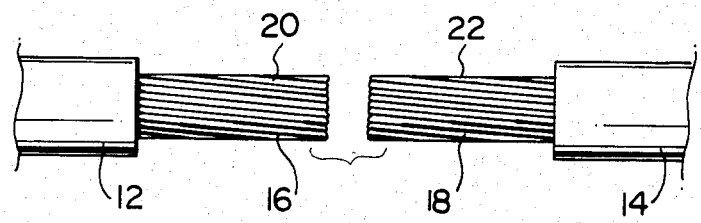
FIG. 1 is a side elevational view of two ends of two cables prepared for splicing the cables together.

As shown in FIG. 1, two cables 12 and 14 are to be joined together by electrically interconnecting each individual conductor 16, 18 of the cable cores 20 and 22 with an individual conductor of the other cable.

To enable splices to be formed between the conductors, the core surrounding material of each cable end, namely a metal sheath or shield 24 and polymeric jacket material 26, is removed to expose a projecting portion of the core 20 or 22 extending beyond the end portions of the jacket 26. As will be described, it is necessary in the following of the method according to this invention, to turn the connected conductors so that they extend axially over one jacket 26 or the other to position their splices outside and supported by the jacket. To allow for this procedure to be followed, the length of conductors extending beyond the jacket and sheath of each cable should be sufficient for the purposes. In this particular case which involves the joining of two underground telecommunications cables, each having 400 pairs of conductors, it has been found that each cable sheath and jacket should be removed sufficiently far to expose a projecting portion of cable core of approximately 300 millimetres.

The conductors of each core end are then splayed outwardly so that they project in all radial directions from the cables and separation of the conductor pairs is achieved. This operation then enables the cable ends to be disposed substantially in axial alignment with the core surrounding material closer together than would be the case if the cores were left in their condition shown in FIG. 1. The cable ends are in fact brought together in this particular construction so that the sheaths 24 are approximately 75 millimetres apart. A metal conductor 28 is located so as to bridge the gap between the metal sheaths 24 and is secured to them in conventional fashion to electrically connect them together. This is the stage in the process shown by FIG. 2.

Figure 2:
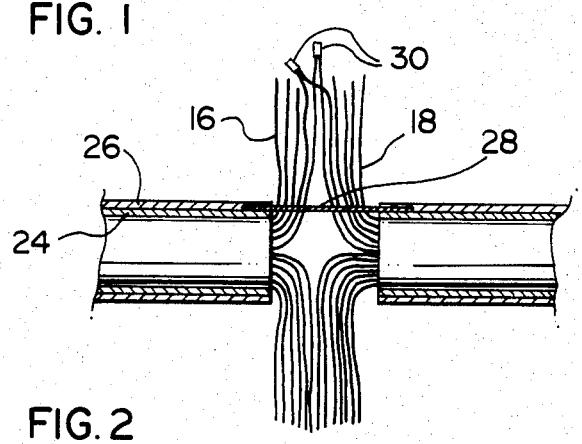
FIG. 2 is a cross-sectional view of the cable ends showing one stage in the method of joining.

Pairs of electrical conductors from one cable are then electrically spliced to pairs of the other cable. This is done by taking each individual conductor of each pair and splicing it in known fashion, i.e. by the use of connectors 30, to an individual conductor of the other pair. As the pairs of conductors have been splayed outwardly from the cable ends, then conveniently the conductor splices may be formed at the ends of the projecting conductors with the connectors 30 disposed outwardly from the cables. FIG. 2 shows two such connectors disposed in position.

At this stage, it is necessary to dispose each of the splices provided by the conductor ends and connectors 30, within a sealing means in a first stage towards sealing the splices from outside moisture.

Figure 3:
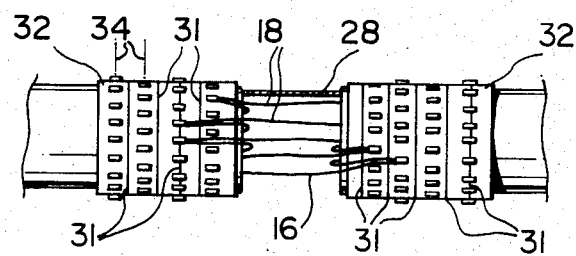
FIGS. 3 and 4 are side elevational views of the cable ends showing further stages in the method.

Initially to seal the splices, first windings 31 of a heat softenable sealing tape are wound in overlapping and contacting relationship upon the end portion of each of the jackets 26 to provide a layer 32 of the sealing tape as shown in FIG. 3. The sealing tape in this embodiment is an ethylene-propylene rubber sealing tape. The pairs of spliced conductors are then turned down onto one or other of the end portions of the jackets 26, so that the splices lie upon the first layer 32. As will be seen from FIG. 3, this turning action results in a conductor from each spliced pair extending from its own cable across to the other cable and lying upon the layer 32 of the other cable. The other conductor of each spliced pair is turned around the sheath and jacket of its own cable, so as to extend axially back along the cable. In a preferred arrangement as is shown by this embodiment, it is practical to locate the splices in some pattern to allow for as many splices as possible to be disposed upon each layer 32 in a relatively small space. One particular pattern of practical value is that shown in FIG. 3. As shown therein, the splices are disposed upon each layer 32 in circumferentially extending bands 34 with the splices spaced in each band. To assist in the passage of the conductors between the splices of some bands so as to reach others, then it is convenient to locate the splices in adjacent bands in staggered relationship as shown by FIG. 3.

Figure 4:
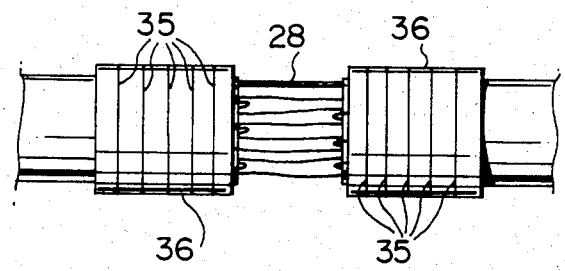
Figure 5:
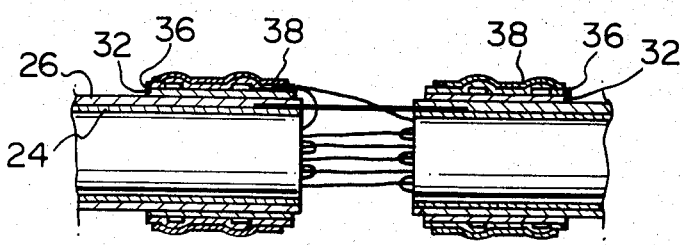
FIGS. 5 and 6 are cross-sectional views of the cable ends showing final stages in the method of joining.
Figure 6:
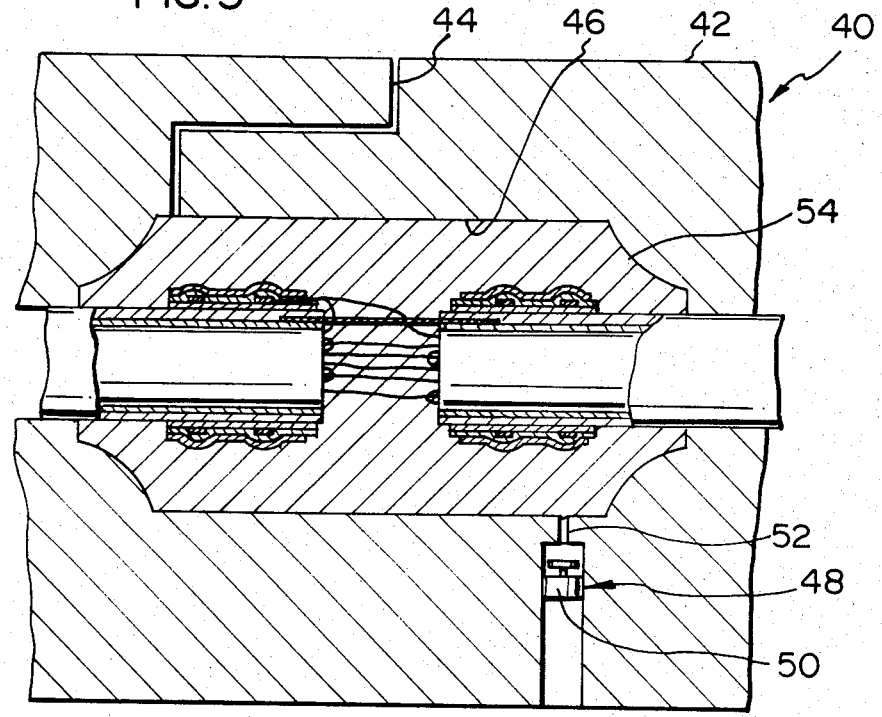

The splices are then covered by second windings 35 of the tape. These windings are disposed directly on top of the layer 32 to contact both the layer 32 and the splices. These second windings are also overlapped and contacting each other to provide a layer 36 overlying the layer 32. This is shown by FIGS. 4, 5 and 6. The layer 36 is then surrounded by a further layer 38 of a material, which remains unsoftened during softening of the material in the layers 32 and 36 as will be described. This layer 38 is provided to prevent the material of layers 34 and 36 from being displaced from their positions surrounding the splices during application of heat and pressure in the further stages of the process. The layer 38, shown in FIGS. 5, 6 and 7 may consist of any suitable material such as overlapped wrappings of glass tape, or as in this embodiment, vinyl tape.

The assembly thus formed is then enclosed in an encapsulation provided by a low pressure moulding technique. This technique involves the use of moulding pressure below 100 lbs./sq. in., and preferably in the region of 15 lbs./sq. in. or less. The material of the encapsulation is preferably chosen for its compatibility with the jacket material of the cables. In this particular case, where the jacket material is based on polyethelene, then the encapsulation should be formed from a mouldable ethylene acrylic acid, ionized resins, a polyethelene, or ethylene vinyl acetate. Examples of these materials which are compatible with polyethene are ethylene acrylic acid sold by Dow Chemical of Canada Limited under their product Nos. 459, 455 and 435, ionized resins sold by Dupont under their trade names 'Surlyn' 1652 and 'Surlyn' 1702, and ethylene vinyl acetate sold by Dupont of Canada Limited under their product No. 3180. The bond between ethylene acrylic acid and polyethylene depends upon the amount of acrylic acid in the encapsulation material.

In this particular embodiment where it is desired to form a seal between the polyethylene jacket and the encapsulation material, and also a seal between the ethylene propylene rubber tape layers 32 and 36 with the encapsulation, then it is preferable to use polyethylene as the mouldable material. It has been found that the tape material in the layers 32 and 36 will bond easily to polyethylene when the tape is softened by application of heat. Thus, under circumstances of moulding as in this present case, sufficient heat will soften the tape in the layers 32 and 36, so as to bond the tape both to the polyethylene of the jacket and also to the polyethylene of the encapsulation.

Figure 7:
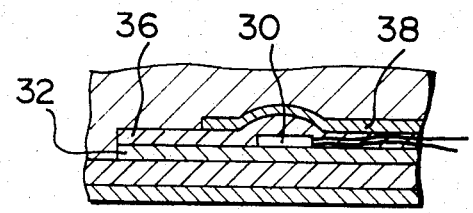
FIG. 7 is a detailed view of part of the finished assembly of cable ends and on a larger scale.

The partially assembled connection between the cable ends 12 and 14 and as shown in FIGS. 4 and 5, is then assembled within a low pressure mould 40 as shown in FIG. 6. This mould comprises mould halves 42. Only one of these is shown as the view is taken on the parting line of the mould. Mouldable material is extruded through inlet gate 44 into cavity 46 to mould the encapsulation with the polyethylene material. The polyethylene flows throughout the mould and fills the cavity and also fills any gaps existing between the conductors and lying between the spaced ends of the jackets 26 as shown by FIG. 6. Upon the mould becoming full with material, the mould then switches off automatically by the use of a switch means 48 which is operated automatically upon the mould becoming full. This switch is described in detail in abandoned U.S. Pat. Application Ser. No. 345,774 filed Feb. 4, 1982 in the name of L. J. Charlebois et al and entitled, "Moulding of Plastics Articles". As shown by FIG. 6, the switch means comprises a limit switch 50 disposed within a passageway 52 spaced from the mould cavity. The passageway 52 is bridged by the molten material within the cavity during filling, but the surface tension in the material and the smallness of the cross-sectional area of the passageway 52 prevents the molten material from flowing down the passageway to operate the switch. Upon the mould becoming full, however, the pressure within the mould increases slightly, e.g. up to 15 lbs./sq. in. and the molten material is allowed to flow down the passageway 52 to operate the switch, which then stops the rotation of the extruder. The temperature of the molten material is such that the heat passes through the vinyl tape layer 38 and heats and softens the layers 32 and 36. This softening of the ethylene propylene rubber tape causes the windings and layers to merge together so as to form the ethylene propylene material into a single mass which closely surrounds and encloses each of the splices. Upon cooling of the molten material the ethylene propylene rubber also cools and hardens. The cooling encapsulation 54 applies a compressive force upon the ethylene propylene material through the vinyl so that the ethylene propylene material shrinks to lie intimately in contact with the splice surfaces. As the splices are in fact located upon the outside of the jacket 26, then the jacket provides a support for the ethylene propylene tape, in which case shrinkage takes place effectively and provides a fluid tight seal upon the otherwise bared conductor wires and connectors 30. Fluid tight sealing is also provided between the ends of the encapsulation and the polyethylene of the jacket by virtue of the fact that the jacket becomes softened and merges with the encapsulation. In addition to this, before encapsulation, the vinyl tape layer 38 was applied so as to leave end portions of the layers 32 and 36 projecting outwardly from ends of the layer 38. A projection of 0.5 inches is sufficient. This is shown in FIGS. 5, 6 and 7. Thus, at each end of the vinyl tape, the polyethylene of the encapsulation contacts the ethylene propylene material and causes it to bond to the polyethylene, thereby forming another sealing position.

The above method according to the invention and as described in the embodiment, provides an effective seal for joining cable ends together. The location of the splices upon the cable jacket ensures that the cooling ensulating material squeezes down upon the ethylene propylene tape, so that each of the splices is sealed effectively. This seal is enhanced by the seals provided between the encapsulation and the jacket, and between the encapsulation and the ends of the ethylene propylene tape. Also it is ensured that any moisture which may be present in the cores of the cables cannot reach the splices themselves, because this moisture cannot pass through the seals provided between the encapsulation and the ethylene propylene rubber tape of layers 32 and 36 nor through the seal of the integral mass of rubber surrounding each splice. In tests which have been performed upon cable ends joined in this manner, it has been shown that after subjecting the encapsulated region to thermal cycling, a dependable seal has been provided in each case which permits of no failures caused by moisture reaching the bared wires or connections 30 of any splice.

What is claimed is:

1. A method of forming an encapsulate splice region between two cable ends comprising:
   removing core surrounding material from end portions of two cables to provide end portions of core surrounding material and cable core regions projecting a certain distance beyond said end portions of surrounding material;
   turning the conductors of said regions so that they extend radially outwards from the cables;
   bringing the cable end portions and portions of core surrounding material closer together and axially disposed relative to each other;
   electrically connecting conductors of one cable end with those of the other to form conductor splices;
   positioning splices upon first overlapped and contacting windings of heat softenable sealing tape around an end portion of core surrounding material with the conductors extending across the end portion and to their respective cable cores and with the splices disposed in spaced positions both axially of and circumferentially around the end portion;
   wrapping second windings of heat softenable sealing tape in overlapped and contacting relatinship over the splices and first windings;
   and encapsulating axially over the end portions of core surrounding material to cover the splices and windings, heat provided while encapsulating serving to soften the sealing tape to cause it to merge into an integral whole completely surrounding each splice.

2. A method according to claim 1, comprising encapsulating by moulding an encapsulation of plastics material around the splice region, the heat from the plastics material in a molten state causing the sealing tape to merge into the integral whole, and cooling the encapsulation to shrink it upon the softened sealing tape, the resltant pressure causing the merged and softened single mass of tape around each splice to become in intimately and fluid tight sealing contact with the splice.

3. A method according to claim 1, wherein the material of the radially outer regions of the core surrounding material and the encapsulation material are compatible and merge and bond together during moulding.

4. A method according to claim 3, wherein the heat softenable sealing tape is compatible with the encapsulation material, the sealing tape is wrapped with a containing material which is non heat softenable at the moulding temperature, the containing material holding the sealing tape in its position after softening, said projecting sealing tape bonding to encapsulation material during moulding.

5. A method according to claim 4, wherein the radially outer regions of the core surrounding material and the encapsulating material are or contain polyethylene, and the sealing tape is an ethylene propylene rubber tape.

6. A method according to claim 1, wherein the splices are positioned upon the first windings in a plurality of axially spaced apart, circumferentially extending rings around the windings, and the splices in each ring are circumferentially spaced apart.

7. A method according to claim 6, wherein the splices are in circumferentially staggered relationship from one ring to the next.

8. An assembly of two telecommunications cables disposed end-to-end with conductors of each cable core electrically connected each to one conductor of the other cable to form a conductor splice, the conductors for each splice extending outwardly from the cores and extending axially alongside core surrounding material of one of the cables to dispose the splice radially outwards of the core surrounding material with splices disposed in spaced positions both axially of and circumferentially around an end portion of the core surrounding material, each splice individually sealed by sealing material, and an encapsulation extending across the two cable ends so as to surround the sealed splices and end portions of the core surrounding material.

9. An assembly according to claim 8, wherein the splices are located upon the end portion in a plurality of axially spaced apart, circumferentially extending rings with the splices in each ring circumferentially spaced apart.

10. An assembly according to claim 9, wherein the splices are in circumferentially staggered relationship from one ring to the next.

* * * * *